United States Patent [19]

Yasuda et al.

[11] Patent Number: 5,691,774
[45] Date of Patent: Nov. 25, 1997

[54] APPARATUS FOR DETECTING MOTION VECTOR AND ENCODING PICTURE SIGNALS

[75] Inventors: Kazunori Yasuda, Kanagawa; Tsuyoshi Oda, Chiba; Kouichi Uchide, Kanagawa, all of Japan

[73] Assignee: Sony Corporation, Tokyo, Japan

[21] Appl. No.: 507,103

[22] Filed: Jul. 26, 1995

[30] Foreign Application Priority Data

Jul. 27, 1994 [JP] Japan .................... 6-175529

[51] Int. Cl.[6] .................... H04N 7/36
[52] U.S. Cl. .................... 348/413; 348/396
[58] Field of Search .................... 348/413, 412, 348/411, 401, 402, 396, 397, 415, 416, 699, 595; 382/236, 238

[56] References Cited

U.S. PATENT DOCUMENTS

| | | | |
|---|---|---|---|
| 4,371,895 | 2/1983 | Koga | 348/413 |
| 4,777,530 | 10/1988 | Kondo . | |
| 4,897,720 | 1/1990 | Wu . | |
| 5,173,773 | 12/1992 | Ueda et al. | 348/412 |
| 5,206,723 | 4/1993 | Parke . | |
| 5,226,093 | 7/1993 | Iwase . | |
| 5,289,274 | 2/1994 | Kondo . | |
| 5,337,086 | 8/1994 | Fujinami . | |
| 5,544,263 | 8/1996 | Iwamura | 348/402 |

FOREIGN PATENT DOCUMENTS

0 330 455  8/1989  European Pat. Off. .
0 478 217  4/1992  European Pat. Off. .

*Primary Examiner*—Amelia Au
*Attorney, Agent, or Firm*—William S. Frommer; Alvin Sinderbrand

[57] ABSTRACT

Apparatus for detecting a motion vector and encoding picture signals. Where a motion vector is obtained by block matching employing a luminance pattern obtained by eliminating dc components from a luminance signal of a picture, and thus containing only ac components, is compared to a motion vector obtained by block matching employing a luminance signal of a picture. An optimum motion vector obtained based upon the result of comparison is employed as a true motion vector for variable length encoding the picture signal. In this manner, a correct motion vector may be detected and employed for variable length coding even in cases where the average luminance of the picture on the screen is varied significantly.

7 Claims, 9 Drawing Sheets

APPARATUS FOR DETECTING MOTION VECTOR AND ENCODING PICTURE SIGNALS

FIELD OF THE INVENTION

The present invention relates to a method and apparatus for detecting a motion vector and for encoding picture signals to transmit or record a moving picture signal from a transmitting side to a receiving side over a transmission channel and displaying the moving picture signal on a receiving side.

BACKGROUND OF THE INVENTION

In a system for transmitting moving picture signals to a remote place, such as a television system, video conferencing system or a television telephone system, it has been a conventional practice to encode picture signals by exploiting the intra-frame correlation or inter-frame correlation of picture signals for signal compaction in order to achieve efficient utilization of the transmission channel. Specifically, where intra-frame correlation is utilized, the picture signals can be compacted by, for example, discrete cosine transform (DCT).

Figure 5A:
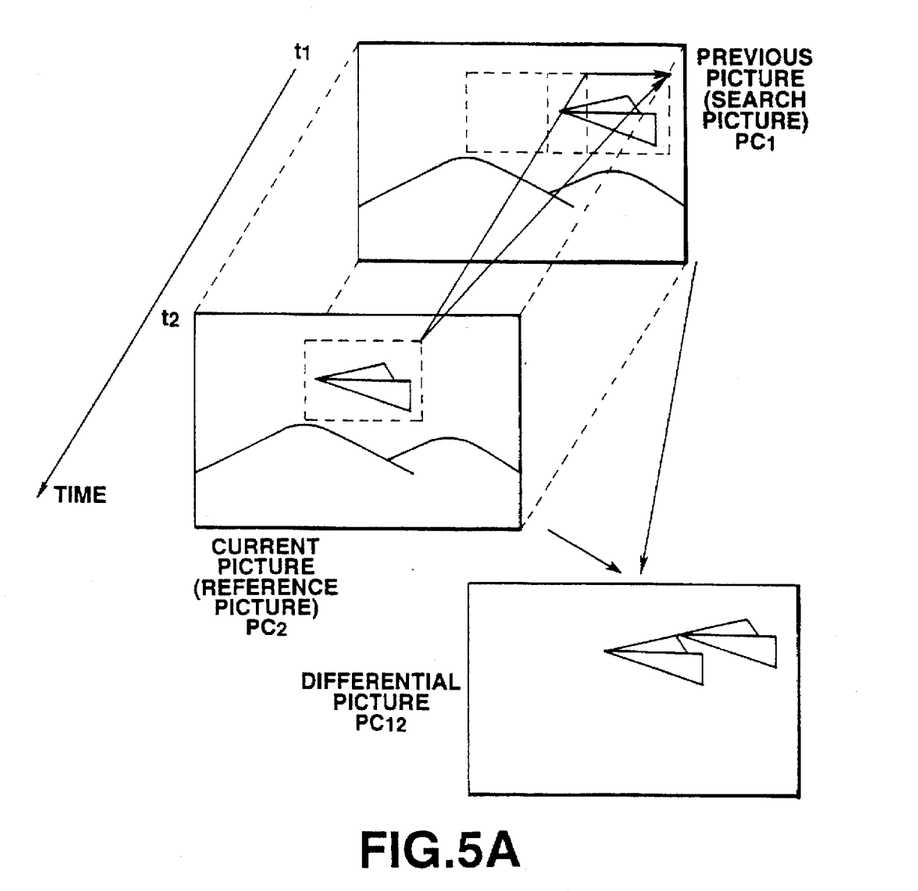
FIG. 5A illustrates picture signal encoding exploiting inter-frame correlation.
Figure 5B:
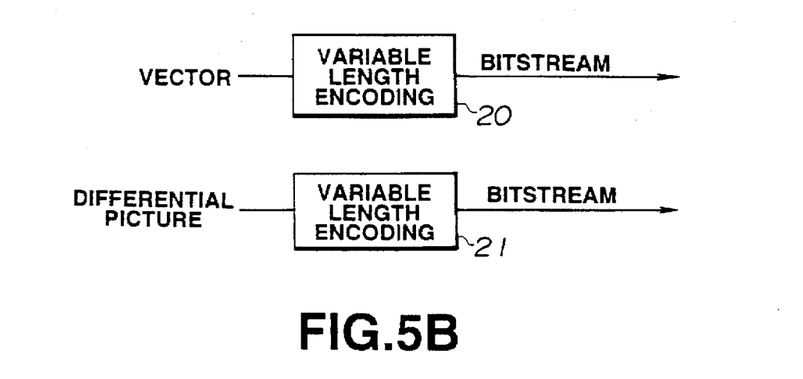
FIG. 5B illustrates picture signal encoding exploiting inter-frame correlation.

On the other hand, should inter-frame correlation be utilized, the picture signals can be encoded for further signal compaction. For example, with reference to FIG. 5a, FIG. 5b and FIG. 8 supposing that a frame picture $PC_1$ as a first picture/frame (or search picture) and a frame picture $PC_2$ as a second picture/frame (or reference picture) are respectively generated at time $t_1$ and time $t_2$. A difference between a picture signal of the frame picture $PC_1$ and a picture signal of the frame picture $PC_2$ is calculated, and a differential picture $PC_{12}$ is generated by the difference between the two picture signals. Since two frame pictures temporally neighboring each other are usually not changed significantly, the calculated difference between the frame picture $PC_1$ and the frame picture $PC_2$ is typically small. This differential may be encoded for compacting the data volume.

Figure 8:
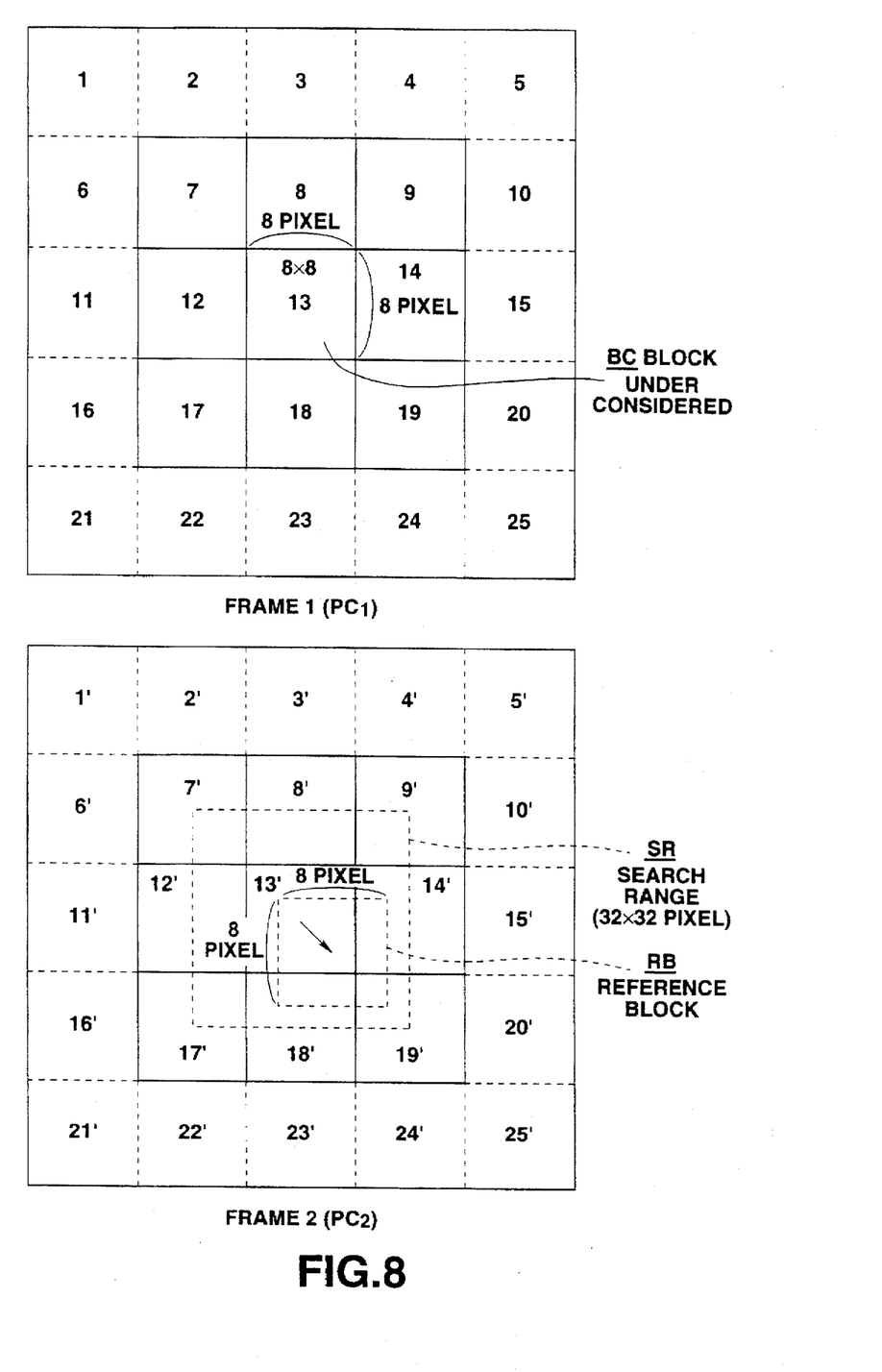
FIG. 8 illustrates a current frame 1 and a reference frame 2 in relation to each other.

In addition, the frame picture $PC_2$ is divided into a plurality of 16-dot by 16-dot blocks (16 vertical dots and 16 horizontal dots). FIG. 8 illustrates a frame picture wherein the blocks are 8-dot by 8-dot. For each of these blocks, picture portions of the frame picture $PC_1$ having strongest luminance signal pattern similarity thereto are searched by a block matching method. In other words, each block of frame picture $PC_1$ is sequentially compared to a corresponding block(search block) of pixels in frame picture $PC_2$. This search block is of a predetermined size, or number of pixels, and is typically larger than the block of frame picture $PC_1$ which is under consideration. For example, the search block may constitute an area which is 32 dot by 32 dot(32 pixels×32 pixels). The above mentioned difference becomes smaller by finding an offset (vector) of the position of the picture portion on the frame picture $PC_1$ thus detected by such block matching search with respect to the position of the corresponding block in the frame picture $PC_2$. This vector is encoded by a variable length encoder 20 shown in FIG. 5B and output as a bitstream, while the difference signal thus found is encoded by a variable length encoder 21 and output as a bitstream. The above-mentioned block matching method is further illustrated in FIG. 6 and FIG. 8.

Figure 6:
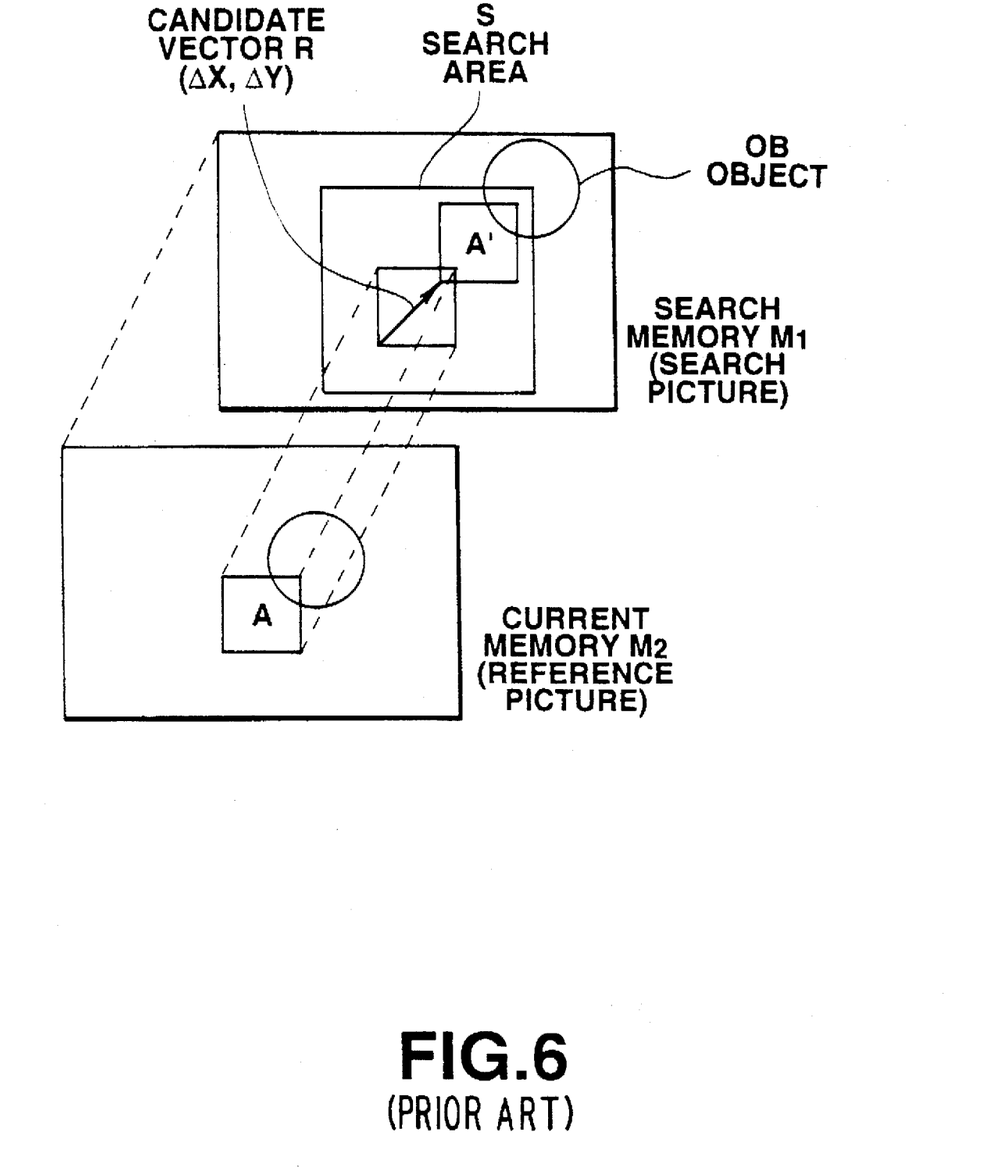
FIG. 6 illustrates a conventional method for detecting the motion vector.

In this block matching method, the portion of the frame picture $PC_2$ in a search range SR which has the strongest similarity in luminance pattern to that of the block under consideration BC from frame picture $PC_1$ is determined. In FIG. 6, a block in the current memory $M_2$ as a reference picture is denoted as A and a block in a search memory $M_1$, as a reference picture, whose candidate vector R is offset by $\Delta X$, $\Delta Y$ is denoted as A'. The sum of absolute values of the differences between the values of the total pixels belonging to the block A in the current memory $M_2$ and the values of the pixels on the block A' in the search memory $M_1$ associated with the respective pixel values in the block A, for example, is calculated. This sum value is termed the residue. The residue, herein termed D ($\Delta X$, $\Delta Y$), is given by the following equation (1):

$$D(\Delta X, \Delta Y)=\Sigma |A(X,Y)-A'(X+\Delta X, Y+\Delta Y)| \quad (1)$$

In the search algorithm usually employed, such as full search or multi-search, a vector ($\Delta X$, $\Delta Y$) which gives a minimum residue value is selected from among the plural residues D ($\Delta X$, $\Delta Y$) obtained in the search area as explained above is simply employed as an optimum motion vector.

Meanwhile, there are occasions wherein, if the vector which gives the smallest residue value is simply selected as an optimum motion vector as conventionally, the motion vector selected becomes vitally different from the actual vector which should be found.

For example, if the average luminance of the picture on the display screen in its entirety is changed, as when the totality of pixels on the screen gradually becomes higher in luminance such that the average luminance of the picture on the display screen in its entirety becomes brighter (fade-in) or, conversely, the totality of pixels on the screen gradually becomes lower in luminance such that the average luminance of the picture on the display screen in its entirety becomes darker (fade-out), the picture portions having the strongest similarity in the luminance signal pattern are searched by the pattern matching method even though the object remains still on the screen. The resulting vector is significantly different from the real one.

Figure 1:
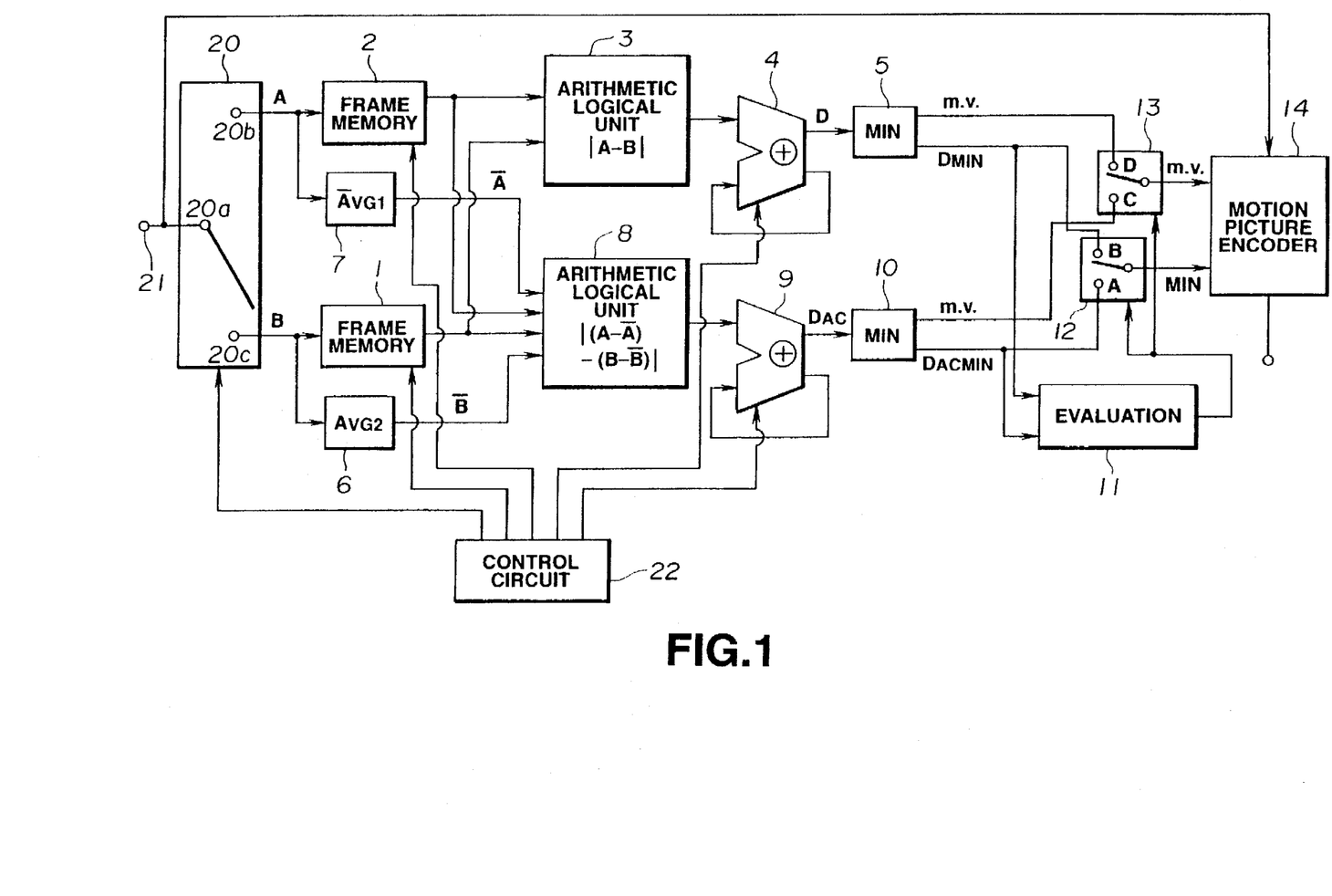
FIG. 1 shows a schematic of one embodiment of the present invention.
Figure 7A:
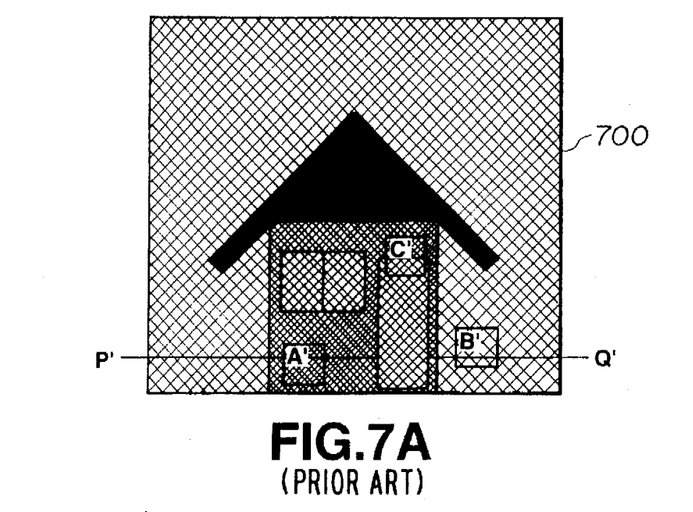
FIG. 7a illustrates a motion vector on a picture during fade-in according to a conventional method for detecting the motion vector and the luminance distribution.
Figure 7B:
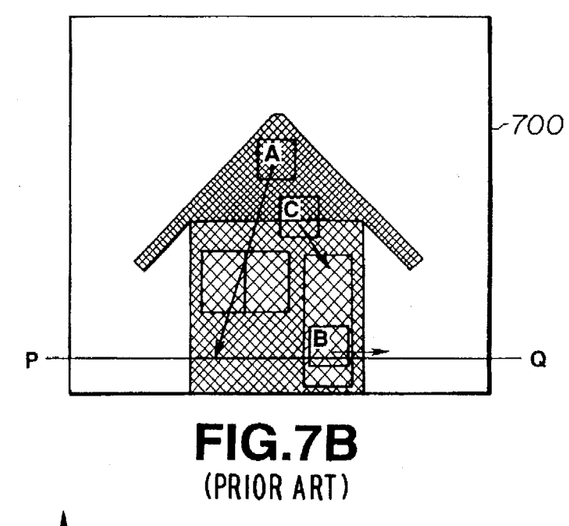
FIG. 7b illustrates a motion vector on a picture during fade-in according to a conventional method for detecting the motion vector and the luminance distribution.
Figure 7C:
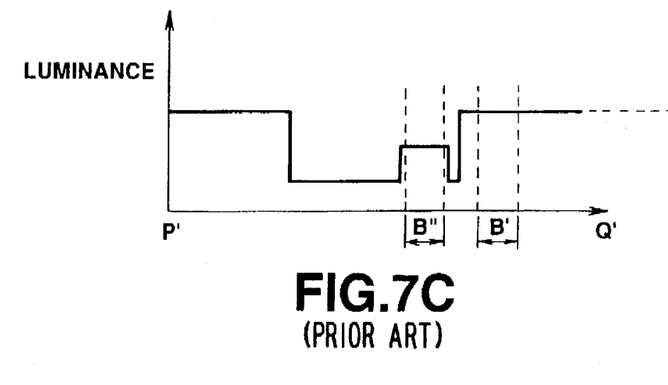
FIG. 7c illustrates a motion vector on a picture during fade-in according to a conventional method for detecting the motion vector and the luminance distribution.
Figure 7D:
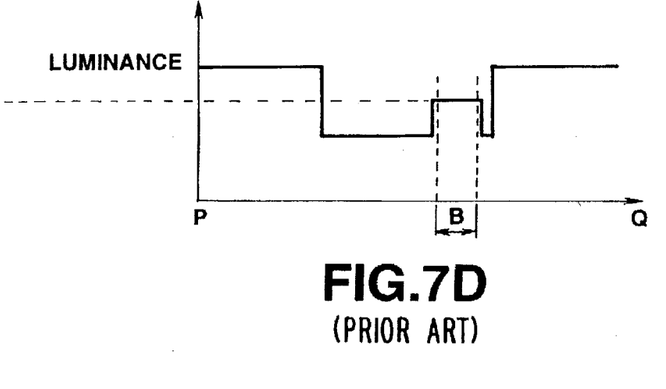
FIG. 7d illustrates a motion vector on a picture during fade-in according to a conventional method for detecting the motion vector and the luminance distribution.
Figure 9:
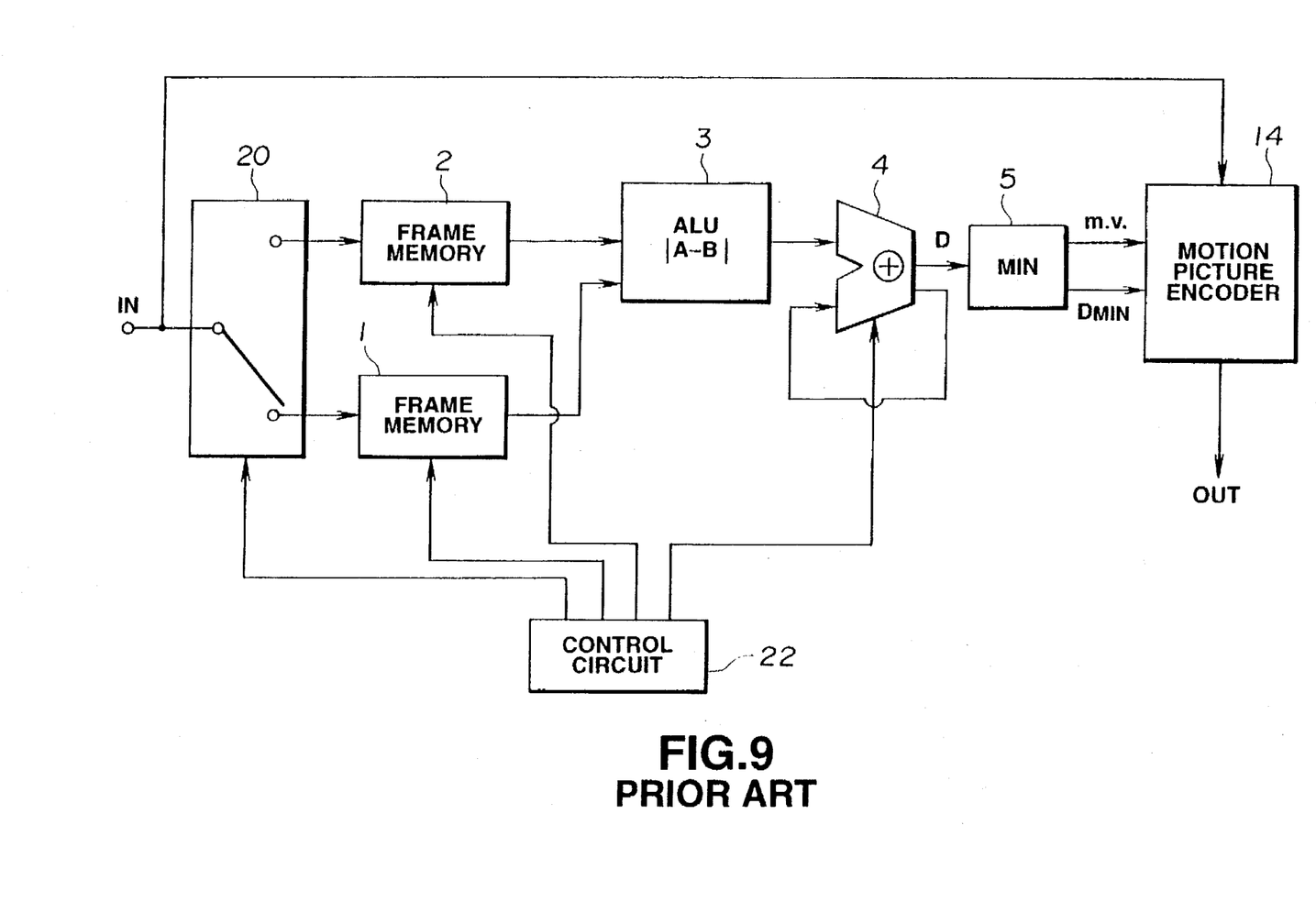
FIG. 9 illustrates a conventional apparatus for motion vector detection.

Specifically, on fade-in of a still picture shown in FIG. 7a, blocks A, B and C in the picture shown in FIG. 7b are detected by the block matching method as picture portions having strongest luminance signal pattern similarity to blocks A', B', and C' in FIG. 7a. The pixel luminance on a line P'Q' of a pre-fade-in picture in FIG. 7a is shown in FIG. 7c, while the luminance on a line PQ of a post-fade-in picture in FIG. 7b is shown in FIG. 7d. Lines P'Q' and PQ each define a predetermined row or line of pixels on a display device. With the block matching method, a luminance portion B shown in FIG. 7d, representing the luminance of a block B in the picture shown in FIG. 7b, has been retrieved as a block having strongest similarity to a luminance portion B' of FIG. 7c representing the luminance of a block B' in the picture shown in FIG. 7a. In effect, the luminance of a block portion at the same position as the block B in the pre-fade-in picture of FIG. 7a is represented by a luminance portion B" shown in FIG. 7c. FIG. 9 illustrates one example of an apparatus for performing the above described block matching function. It should be noted that reference numerals corresponding to like reference numerals in the illustration of the present invention shown in FIG. 1 represent like elements/components.

OBJECT AND SUMMARY OF THE INVENTION

In view of the foregoing, it is an object of the present invention to provide a method and apparatus for motion vector detecting method and picture signal encoding whereby a correct, or predetermined, vector may be detected although the average luminance on the screen is changed significantly.

It is another object of the present invention to provide a recording medium on which picture signals are recorded thereon in accordance with the moving picture detection method and apparatus and the moving picture encoding method and apparatus.

In one aspect, the present invention provides a method and apparatus for detecting motion vector wherein a motion vector obtained by block matching wherein a luminance pattern freed of dc components from a luminance signal of a picture and thus containing only ac components is compared to a motion vector obtained by block matching wherein a luminance signal of a picture and an optimum motion vector based upon the result of comparison is adopted as a true motion vector.

With the picture signal encoding method and apparatus according to the present invention, a true motion vector is obtained using the above motion vector detecting method. Encoding and quantization are performed on a prediction picture signal afforded by the true motion vector. The resulting quantized signal and the motion vector are encoded by variable-length encoding.

In another aspect, the present invention provides a recording medium on which there is recorded a picture signal which is obtained by comparing the results of block matching employing a luminance pattern freed of dc components from a luminance signal of a picture and thus containing only ac components, to a motion vector obtained by block matching employing a luminance signal of a picture. An optimum motion vector based upon the result of the above comparison is a true motion vector, effecting encoding and quantization using a prediction picture signal afforded by the true motion vector, and variable-length encoding the resulting quantized signal and the motion vector.

According to the present invention, a motion vector and minimum value is selected from either a motion vector and minimum value obtained by a conventional block matching method or a motion vector and minimum value obtained by removing dc components from a luminance pattern so as to yield only ac components thereof. The selection between these two motion vectors and minimum values is made based upon the which of the two motion vectors has the minimum value. The motion vector having the minimum value is selected as an optimum motion vector obtained based upon the result of this comparison. This optimum motion vector may be employed for variable length encoding of the video signal even in cases wherein the average luminance of the picture on the screen is varied significantly.

Also it is possible with the recording medium to correctly reproduce the original signal recorded thereon.

DESCRIPTION OF THE PREFERRED EMBODIMENTS

Block matching methods are described in U.S. Pat. No. 4,897,720 for a Circuit Implementation of Block Matching Algorithm, to Lancelot Wu, et. al. and in pending U.S. patent application, Ser. No. 08/302,407 for Motion Vector Detecting Apparatus and Method (applicant: Tetsujiro Kondo; Filing Date: Sep. 8, 1994). The disclosure of U.S. Pat. No. 4,897,720 and U.S. patent application, Ser. No. 08/302,407 is hereby incorporated by reference.

Referring to the drawings, illustrative embodiments of the present invention will be explained in detail. FIG. 1 schematically shows a construction of a device for carrying out the picture signal encoding method according to the present invention.

Data, or pixel values B, of a first frame picture, or reference picture, are input via input terminal 21 to terminal 20a of input selector 20. Control circuit 22 controls input selector 20 to route the data (pixels value B) from input terminal 20a to either output terminal 20b or 20c. In the case of data, or pixel values B, of a first frame picture, control circuit 22 causes input selector 20 to route the data (pixel values B) from terminal 20a to output 20c where it is then stored in frame memory 1 and routed to average luminance calculating circuit 6. Data, or pixel values A, of a second frame picture, or search picture, is input and routed via input selector 20 to output terminal 20b where it is then stored in frame memory 2 and routed to average luminance calculating circuit 7.

First, by way of calculation of residues, the total pixel values in a predetermined block of pixels under consideration, herein represented by a value of a sole pixel A, are read out from the frame memory 2. The pixel values in a block in a search range associated with the pixel A, herein represented by a value of a sole pixel B, are then read out from the frame memory 1. The pixel values A and B read from frame memory 2 and frame memory 1, respectively, in accordance with control circuit 22, are routed to an arithmetic-logical unit 3 where an absolute value of the difference between the pixel values A and B is calculated. This absolute value is routed to an arithmetic-logical unit 4 where the residue D ($\Delta X$, $\Delta Y$), which is the total sum of the absolute values, is calculated.

For carrying out calculations of the residue in accordance with the motion vector detecting method of the present invention simultaneously with the above-described calculations of the residue, the pixel values A and B are routed to average luminance calculating units 7 and 6, respectively. The average luminance calculating units 7 and 6 calculate average luminance values of the pixels A and B, respectively. In other words for a full evaluation of a picture frame block under consideration, the average value of all the A values and B values is calculated by the luminance calculating, units 6 and 7. The average luminance values thus found are routed to an arithmetic-logical unit 8 where an absolute value of the difference between the average luminance value of the pixel A and that of the pixel B is found and routed to an arithmetic-logical unit 9. The arithmetic-logical unit 9 calculates a residue $D_{AC}(\Delta X, \Delta Y)$ based on the absolute value calculated by arithmetic-logical unit 8.

The calculations for finding the residue $D_{AC}(\Delta X, \Delta Y)$ will now be explained in detail. The residue is usually employed by circuitry for retrieving picture portions having strongest luminance signal pattern similarity using the block matching method. With the motion vector detecting method according to the present invention, the block matching method is employed in such a manner as to subtract a dc component as a average luminance of a block under consideration from the pixel value in the block under consideration to give a difference, herein termed an ac component, which ac component is employed in calculating the residue. The residue $D_{AC}(\Delta X, \Delta Y)$ is represented by the equation (2):

$$D_{AC}(\Delta X, \Delta Y) = \Sigma |A(X,Y) - A - (A'(X+\Delta X, Y+\Delta Y) - A')| \quad (2)$$

This value of the residue $D_{AC}(\Delta X, \Delta Y)$ is calculated with the dc component being removed from each pixel so that the average luminance of the block under calculation is equal to zero. Consequently, even if the average luminance is significantly changed between the reference picture (average luminance of search picture=A; average luminance of reference picture=A') and the search picture as in the case of fade-in or fade-out, the block matching may be performed without being affected by changes in the average luminance. Thus a motion vector may be calculated more accurately by comparing the residue D ($\Delta X$, $\Delta Y$) and the residue $D_{AC}(\Delta X, \Delta Y)$ to each other for selecting a more appropriate one of the residues.

Figure 2A:
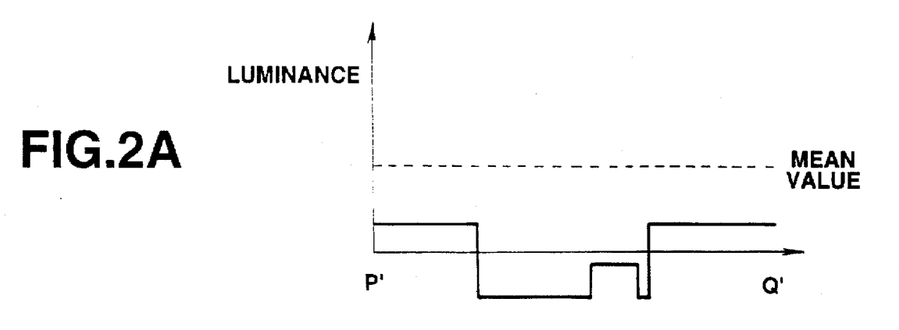
FIG. 2A is a graph showing picture luminance distribution with the method for detecting the motion vector according to the present invention.
Figure 2B:
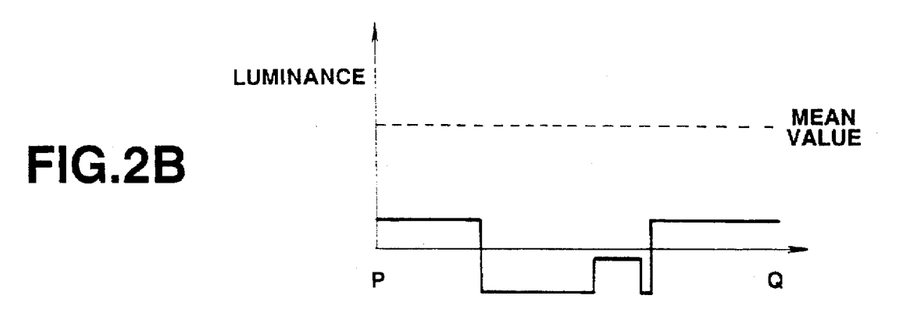
FIG. 2B is a graph showing picture luminance distribution with the method for detecting the motion vector according to the present invention.
Figure 2C:
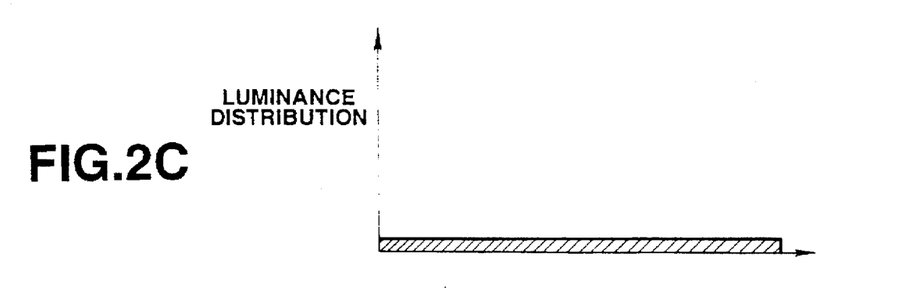
FIG. 2C is a graph showing picture luminance distribution with the method for detecting the motion vector according to the present invention.
Figure 3A:
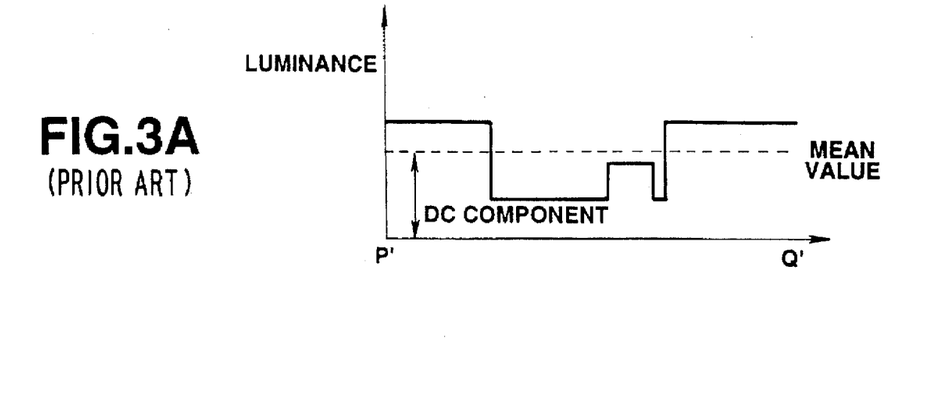
FIG. 3A is a graph showing picture luminance distribution with the conventional method for detecting the motion vector.
Figure 3B:
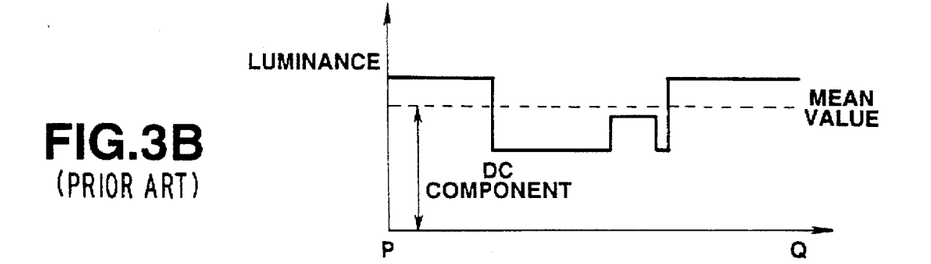
FIG. 3B is a graph showing picture luminance distribution with the conventional method for detecting the motion vector.
Figure 3C:
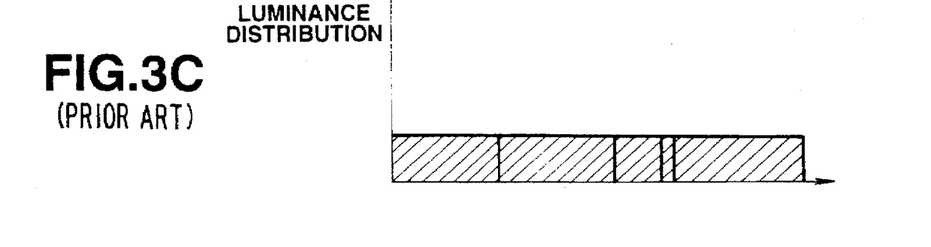
FIG. 3C is a graph showing picture luminance distribution with the conventional method for detecting the motion vector.

FIG. 2a & FIG. 2b shows the luminance distribution in case the dc component has been removed from the pixel value when calculating the residue using the pictures shown in FIGS. 7a and 7b. Specifically, FIGS. 2a and 2b show the luminance distribution in case the dc component has been removed from the pixel values on the line P'Q' in FIG. 7a and that in case the dc component has been removed from the pixel values on the line PQ in FIG. 7b. Lines PQ and P'Q' represent a selected row of pixels across a display screen 700. Thus the difference between the luminance distribution in FIG. 2a and that in FIG. 2b is as shown shaded in FIG. 2c. FIG. 3a shows the luminance distribution of the pixel values on the line P'Q' of the picture shown in FIG. 7a, as found by the conventional motion vector detecting method. FIGS. 3b and 3c show the luminance distribution of pixel values on the line PQ in FIG. 7b and the difference between the luminance distribution of FIG. 3a and that of FIG. 3b. The luminance distribution shown in FIGS. 3a, 3b and 3c is associated with that shown in FIGS. 2a, 2b and 2c.

The arithmetic-logical unit 4 of FIG. 1 calculates the residue D ($\Delta X$, $\Delta Y$) for the totality of blocks within the search range, while the arithmetic-logical unit 9 of FIG. 1 calculates the residue $D_{AC}(\Delta X, \Delta Y)$ for the totality of blocks within the search range. The residue $D_{AC}(\Delta X, \Delta Y)$ as found by the arithmetic-logical unit 4 and the residue $D_{AC}(\Delta X, \Delta Y)$ as found by the arithmetic-logical unit 9 are routed to minimum value calculating units 5, 10, respectively. The minimum value of the residue D ($\Delta X$, $\Delta Y$) and the minimum value of the residue $D_{AC}(\Delta X, \Delta Y)$ are selected by the minimum value calculating units 5, 10, respectively. The minimum value of the residue D ($\Delta X$, $\Delta Y$) and the minimum value of the residue $D_{AC}(\Delta X, \Delta Y)$, selected by the minimum value calculating units 5, 10, respectively, are routed to an evaluating unit 11 where the two minimum values of the residues are compared to each other in accordance with a pre-set evaluation standard. The resulting value of comparison is fed to signal switching units 12 and 13.

The signal switching unit 12 is configured to effect switching between the minimum values of the residues as found by the above-described two motion vector detecting methods. The signal switching unit 12 has its input terminals a and b supplied with the minimum value of the residue $D_{AC}(\Delta X, \Delta Y)$ from the minimum value calculating unit 10 and with the minimum value of the residue D ($\Delta X$, $\Delta Y$) from the minimum value calculating unit 5, respectively. The signal switching unit 13 is configured to effect switching between the motion vectors obtained by the above-described two motion vector detecting methods. The signal switching unit 13 has its input terminals c and d with the motion vector from the minimum value calculating unit 10 and with the motion vector from the minimum value calculating unit 5, respectively. These signal switching units 12, 13 are changed over responsive to the results output from the evaluating unit 11 so that the minimum value of the residue and the motion vector as found by one of the two motion vector detection methods are routed to a motion picture encoder 14. Specifically, whets the average luminance on the screen is changed significantly, the minimum value of the residue and the motion vector from the minimum value calculating unit 10 are routed via the signal switching units 12 and 13 to the motion picture encoder 14. Otherwise, the minimum value of the residue and the motion vector from the minimum value calculating unit 10 are routed via the signal switching units 13 and 13 to the motion picture encoder 14. The motion picture encoder 14 effectuates the encoding using predicted picture signals and processes the encoded signal in a pre-set manner. The motion picture encoder 14 also quantizes the processed signal and variable-length encodes the quantized signal and the motion vector.

The evaluating unit 11 sets, or determines, an evaluation function based upon plural types of sequences and the function thus set is followed without simply selecting a smaller one of the evaluation functions. In other words, evaluating unit 11 outputs a signal based upon which of the minimum values signals $D_{min}$ or $D_{acmin}$, from minimum value calculating units 5 and 10, respectively, meet the predetermined criteria.

Figure 4:
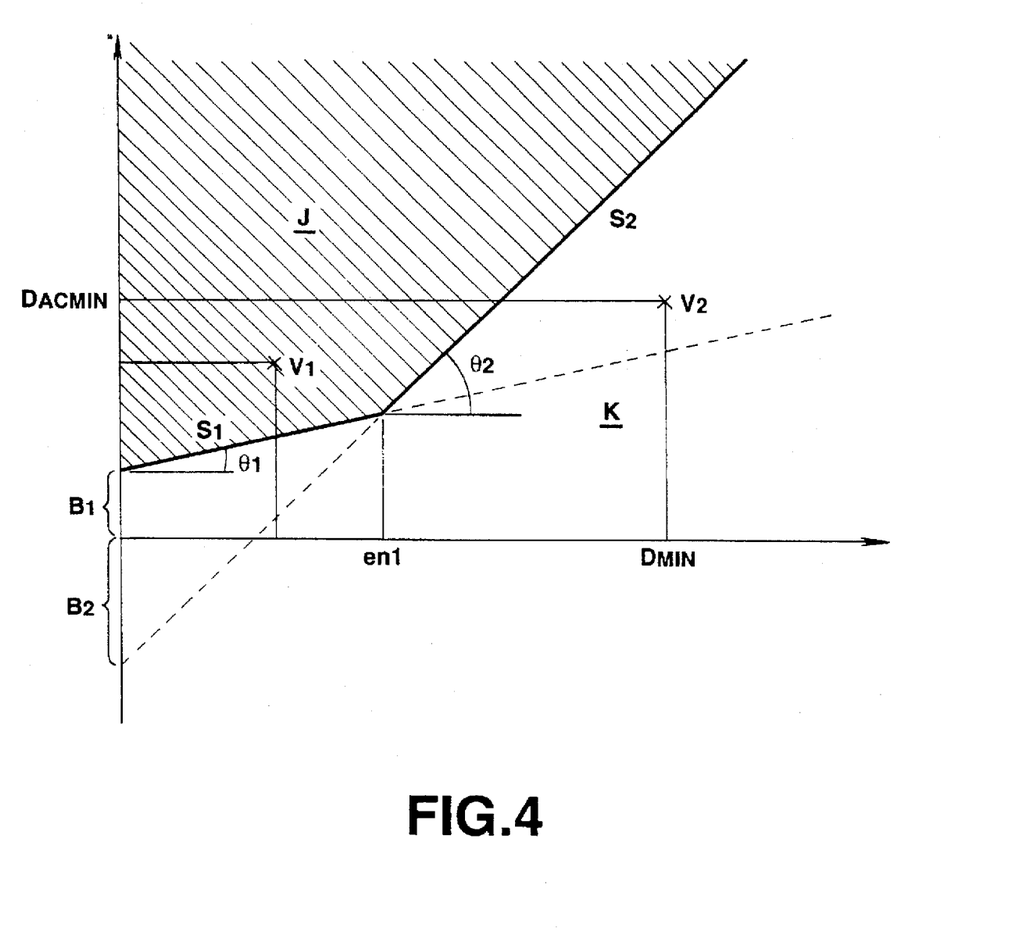
FIG. 4 is a graph showing a typical example of an evaluation function.

FIG. 4 shows illustrative examples of the evaluation function(criteria). In this illustration the lines S1 and S2 are defined as follows:

$S_1: D_{acmin} = \alpha_1 D_{min} + \beta_1$ $S_2: D_{acmin} = \alpha_2 D_{min} + \beta_2$ Assuming that, with a minimum value of the residue D ($\Delta X$, $\Delta Y$) by the conventional method of detecting the motion vector being $D_{min}$ and with a minimum value of the residue $D_{AC}(\Delta X, \Delta Y)$ by the present method for detecting the motion vector being $D_{acmin}$. A pre-set value of the residue D ($\Delta X$, $\Delta Y$) is $e_{n1}$ which is defined by and corresponds to the point of intersection of lines S1 and S2 as shown in FIG. 4. The minimum value $D_{Acmin}$ of the residue $D_{AC}(\Delta X, \Delta Y)$ is such that $D_{acmin} > \alpha_1 (D_{min}) + \beta_1$, while the minimum value $D_{min}$ of the residue $D(\Delta X, \Delta Y)$ is such that $D_{acmin} \leq \alpha_1 (D_{min}) + \beta_1$, for $0 \leq D_{min} < e_{n1}$. Under the same assumption, the minimum value $D_{acmin}$ of the residue $D_{AC}(\Delta X, \Delta Y)$ is such that $D_{acmin} > \alpha_2(D_{min}) + \beta_2$, while the minimum value $D_{min}$ of the residue $D(\Delta X, \Delta Y)$ is such that $D_{acmin} \leq \alpha_2 (D_{min}) + \beta_2$, for $e_{n1} \leq \beta_2$. $\alpha_1 = \tan \theta_1$ while $\alpha_2 = \tan \theta_2$.

With reference to FIG. 1 and FIG. 4, it can be seen that where the values of $D_{acmin}$ and $D_{min}$ fall within the area "J" above the curve defined by lines S1 and S2, as illustrated for example by point V1 on FIG. 4, the evaluation unit 11 causes the switches 12 and 13 to output the signals from terminals B and D to motion picture encoder 14. Likewise, where the values of $D_{acmin}$ and $D_{min}$ fall within the area "K" below the curve defined by lines S1 and S2(example: point V2), the evaluation unit 11 causes the switches 12 and 13 to output the signals from terminals A and C to motion picture encoder 14. Motion picture encoder 14 may be, for example, a MPEG or MPEG II type motion picture encoding device.

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention.

What is claimed is:

1. A method for comparing data representing a first sequential picture frame and a second sequential picture frame to detect a motion vector, comprising the steps of:

generating a first motion vector and first minimum value by block matching said data of said first sequential picture frame and said second sequential picture frame on the basis of luminance patterns included in said picture frames and calculating a difference between matched blocks of said first and second sequential picture frames, wherein a luminance pattern is obtained by eliminating dc components from a luminance signal so as to yield only ac components;

generating a second motion vector and second minimum value by block matching said data of said first sequential picture frame and said second sequential picture frame and calculating a difference between matched blocks of said first sequential picture frame data and said second sequential picture frame data;

evaluating said first motion vector and first minimum value against said second motion vector and second minimum value to determine which meets a predetermined criteria;

outputting either said first motion vector and first minimum value or said second motion vector and second minimum value as an optimum motion vector and optimum minimum value based upon said evaluating; and encoding video frame data based upon said optimum motion vector and optimum minimum value.

2. A method for encoding a prediction picture signal comprising the steps of:

generating a first motion vector and minimum value generated by block matching blocks according to a luminance pattern obtained by eliminating dc components from a luminance signal of a picture and thus containing only ac components, comparing said first motion vector to a second motion vector generated by block matching blocks according to a luminance signal of a picture;

generating an optimum motion vector, as a true motion vector, based upon comparing said first motion vector and said second motion vector;

effecting encoding and quantization on a prediction picture signal using said true motion vector; and variable-length encoding both the resulting quantized signal and said true motion vector.

3. An apparatus for encoding a video signal comprising:

input means for receiving an input video signal on a sequential frame by frame basis;

first memory means for storing first frame data received by said input means representing a plurality of pixel luminance values;

second memory means for storing second frame data received by said input means representing a plurality of pixel luminance values;

first arithmetic logic means for calculating a difference between luminance values of said second frame data and said first frame data in accordance with the expression:

$$Out_1 = |A - B|$$

where A represents a luminance value of said first frame data and B represents a luminance value of said second frame data, and outputting a first output signal representing same;

first average luminance calculating means for calculating the average luminance value of said first frame data;

second average luminance calculating means for calculating the average luminance value of said second frame data;

second arithmetic logic means for generating a second output signal in accordance with the expression:

$$Out_2 = |(A - A_{avg}) - (B - B_{avg})|$$

where $A_{avg}$ represents the total average luminance value of said first frame data and $B_{avg}$ represents the total average luminance value of said second frame data;

evaluation means for comparing the value of said first output signal with the value of said second output signal to determine which value meets predetermined criteria;

means for generating an optimum motion vector and optimum minimum value from one of either said first output signal or said second output signal determined to meet said predetermined criteria; and encoder circuitry for encoding said video signal in accordance with said optimum motion vector and optimum minimum value.

4. A method for detecting a motion vector comprising the steps of:

storing first picture data into a first memory;

storing second picture data into a second memory;

wherein, said first picture data and said second picture data represent sequential frames of video images;

generating a first motion vector based upon the difference in luminance values between said first picture data and said second picture data, wherein said dc components of said luminance values have been removed;

generating a second motion vector based upon the difference in luminance values between said first picture data and said second picture data;

comparing said first motion vector and said second motion vector to determine which has the lesser value; and outputting as an optimum motion vector, whichever of said first motion vector or said second motion vector has the lesser value.

5. An apparatus for detecting a motion vector between a present frame and a preceding frame of an input digital picture signal which includes DC components and AC components comprising:

eliminating means for eliminating DC components from the input digital picture signal to provide a digital picture signal containing only AC components;

first motion vector generating means for generating a first motion vector and first minimum value from the digital picture signal provided by said eliminating means by utilizing block matching;

second motion vector generating means for generating a second motion vector and second minimum value from the input digital picture signal by utilizing block matching;

evaluation means for evaluating said first and second motion vectors to determine which meets predetermined criteria; and selection means for selectively outputting said first motion vector of said second motion vector on the basis of said evaluation of said evaluation means.

6. An apparatus for detecting a motion vector between a present frame and a preceding frame of an input digital picture signal which includes DC components and AC components according to claim 5, wherein said first motion vector generating means further comprises first calculating means for calculating a summation value of absolute values of differences of luminance values in each associated position between a reference block in a preceding frame and a block under consideration in a present frame.

7. An apparatus for detecting a motion vector between a present frame and a preceding frame of an input digital picture signal which includes DC components and AC components according to claim 6, further comprising:

means for detecting a first smallest summation value calculated by said first calculating means and generating the first motion vector based upon a position of a reference block associated with said first smallest summation value;

said second motion vector generating means comprise second calculating means for calculating a summation value of absolute values of differences of luminance values in each associated position between a reference block in a preceding frame and a block under consideration in a present frame, means for detecting a second smallest summation value calculated by said second calculating means and for generating the second motion vector in accordance with the second smallest summation value; and said evaluation means evaluates which of said first or second motion vectors is preferable on the basis of the first and second smallest summation values supplied from said first calculating means and said second calculating means.

* * * * *